APPARATUS FOR ALIGNING PRINTING FORMS

Filed Feb. 10, 1969 2 Sheets-Sheet 1

*Inventor*
FRANZ MOOS
By [signature]

Oct. 19, 1971 F. MOOS 3,613,252

APPARATUS FOR ALIGNING PRINTING FORMS

Filed Feb. 10, 1969 2 Sheets-Sheet 2

Inventor

FRANZ MOOS

By Albion C. Colland

United States Patent Office 3,613,252

Patented Oct. 19, 1971

3,613,252

APPARATUS FOR ALIGNING PRINTING FORMS

Franz Moos, Frankenthal, Pfalz, Germany, assignor to Schnellpressenfabrik Frankenthal, Albert & Cie, Frankenthal, Pfalz, Germany Filed Feb. 10, 1969, Ser. No. 797,798
Claims priority, application Germany, Feb. 27, 1968, P 16 11 387.4
Int. Cl. B41b *1/00*
U.S. Cl. 33—184.5 6 Claims

ABSTRACT OF THE DISCLOSURE

A method and apparatus for mounting printing forms and the like onto a separate form mounting device for application to form cylinders and form saddles of printing form carriers consisting of mounting the color matter of the transparent print onto a transparent foil having a fixed measurement cross hair and aligning this foil with its corresponding printing form so that the combination can be mounted onto a printing form carrier. The apparatus is provided with a guide rail means which is mounted parallel with respect to printing form carrier and a pivotable arm which is mounted on the guide rail means for step-by-step movement so that the transparent print which is mounted on its transparent foil can be aligned onto the printing form carrier.

The present invention relates in general to a method and apparatus for aligning printing forms.

More specifically, the present invention relates to a method and apparatus for aligning printing forms and the like onto form cylinders, form pieces, etc., whereby the mounting is carried out in a mounting frame in a separate form mounting device.

Conventional methods of printing presses are carried out with reference to the mounting frame, i.e., a fixed point on the mounting frame is read by a measuring device, and then a corresponding fixed point on the printing form is aligned accordingly. A conventional method as described above is disclosed in German Patent 1,238,933.

Another conventional method utilizes a transparent print which is mounted in a cup-shaped mount made of Lucite. A fitting plate is then mounted onto this Lucite mount. Thereafter, the corresponding partial segment of the color printing block must be aligned, and subsequently held in position by a suction force before being finally affixed.

The above-described conventional methods have been found to be disadvantageous since either measuring lines are required on the printing forms or the printing forms have to be aligned in a rather sensitive manner. However, it is not always possible to correctly and sensitively align the forms by these conventional methods, particularly for multi-color prints.

It is therefore an object of the present invention to overcome the above described disadvantages by providing an improved method and apparatus for mounting printing forms.

It is a further object of this invention to provide a novel printing form mounting device which facilitates alignment of the individual colors and subsequently affixes the printing forms onto the form cylinder or the form saddle with high precision by use of a foil.

In accordance with the method and apparatus of the present invention, a transparent print is mounted on a transparent foil on an aligning table for each color matter. The foil is hten provided with a cross hair in a fixed measured position. Thereafter, each transparent print on a transparent foil is mounted onto a corresponding printing form and is affixed thereto. The cross hair on the foil is aligned on the printing form in its measured fixed position, and then mounted on the printing form carrier.

It can be observed that with the novel method, it is possible to mount the transparent print apart from the form mounting device since it is now only necessary to align the transparent print with the printing form, with only the assistance of the cross air. In order to accomplish this, the invention uses a form mounting device, having a guide rod or the like located parallel with respect to the printing form carrier and secured between the frame supports of the device. A pivotable arm, which is provided with the cross hair is movably mounted on the guide rod. The pivotable arm is movable in a step-by-step operation in both directions by means of ratchets, teeth, or the like, whereby the linear graduation on the form mounting device corresponds with the linear graduation on the aligning table. The guide rod or the like, is movable in accordance with the linear graduation in the same step-by-step movement with respect to the printing form carrier, and vice versa.

In a further embodiment of the invention, the pivotable arm may be idly arrested in individual rest positions by means of clamp bolts or the like, whereby during the mounting of a round form onto a cylinder, the cylinder is rotated by means of a worm gear and a worm wheel which have the same spacing as the resting positions of the pivotable arm. Thus, the worm gear can be blocked when the pivotable arm is arrested. In still a further embodiment of the invention, the worm wheel which drives the round printing form carier comprises segments which correspond with the number of forms carried by the printing form carrier for compensating for differences between the arresting spaces and the circumference of the cylinder. The segment which is arranged between the printing forms is loosely turnable while the worm wheel in the range of the forms is connected with the printing form carrier. The segments which are arranged between the printing forms are controlled by means of a cam and a roller in such a manner that the difference, at the time of engagement, of the worm gear segment with the segment of the worm wheel which is connected with the next form saddle, is compensated so that the segments will run faster when the diameter of the printing form is larger, or will lag when the diameter of the printing form is smaller.

Other objects and features of the present invention will become apparent from the following detailed description considered in connection with the accompanying drawings, which disclose the present invention. It should be understood, however, that the drawings are designed for the purpose of illustration only, and not as a definition of the limits of the invention, as to which reference should be made to the appended claims.

In the drawings wherein similar reference characters denote similar elements throughout the several views.

Figure 1:
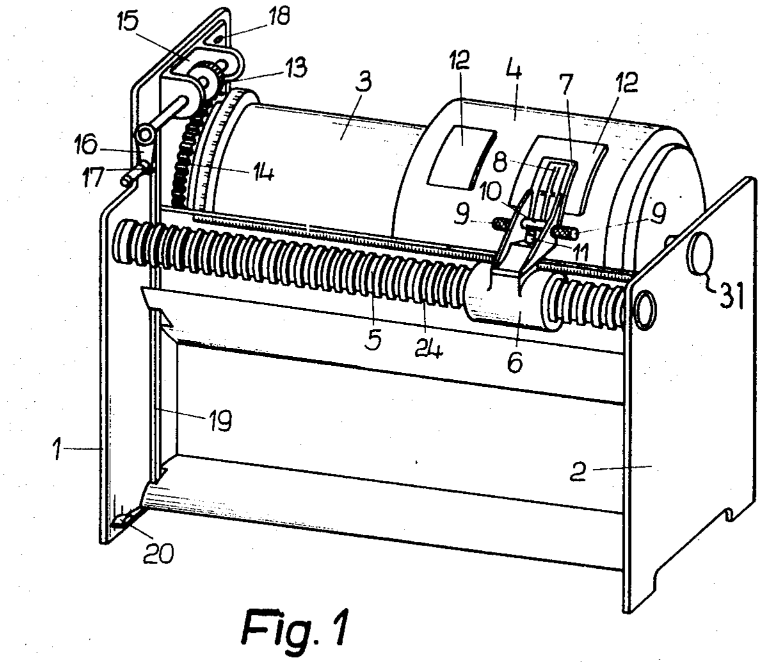
FIG. 1 is a prospective view of a printing form mounting device for round printing forms according to the invention.

The printing form mounting device for round printing forms as shown in FIG. 1 consists of two side support frames 1 and 2, between which a printing form carrier 3 is pivotably mounted for rotation around shaft 31. The ends of shaft 31 are supported in frames 1 and 2. A form saddle 4 is mounted on printing form carrier 3 of the shown embodiment. A guide rail 5 is secured at its ends between support frames 1 and 2, parallel with respect to printing form carrier 3. A pivotable arm 6 is mounted for step-by-step movement along guide rail 5. In one embodiment of the invention, guide rail 5 is provided with trapezoidal threads or ratchet teeth 24 having a defined pitch, such as for example 20 mm.

On its upper end, pivotable arm 6 carries a transparent disc or plate 7 which is provided with a cross hair 8. Two handles 9 are provided for positioning and clamping pivotable arm 6 to trapezoidal threads 24 of guide rail 5 by means of an eccentric part 10 urged against through bolt 11 which engages rail 5 (not shown). The printing forms 12 can thus be aligned on form saddle 4 with the assistance of cross hair 8.

A worm gear 13 and a worm wheel 14 serve to rotate printing form carrier 3. Worm gear 13 is supported in a bearing mount 15 secured to frame 1 and may be turned by means of hand crank 16. Hand crank 16 may be locked or arrested in plate 17 extending from frame 1, to prevent rotation of form carrier 3. Worm gear 13 and worm wheel 14 are so arranged that a complete rotation of hand crank 16 moves printing form carrier 3 a displacement which corresponds to one spacing of guide rail 5.

In order to maintain worm gear 13 and worm wheel 14 in an idle position, bearing mount 15 is constructed pivotable about pin 18 secured through mount 15 to frame 1. Worm gear 13 may then be urged into the teeth of worm wheel 14 by means of rod 19 and pedal 20 coupled to the end thereof, since the top end of rod 19 is coupled to mount 15.

Figure 2:
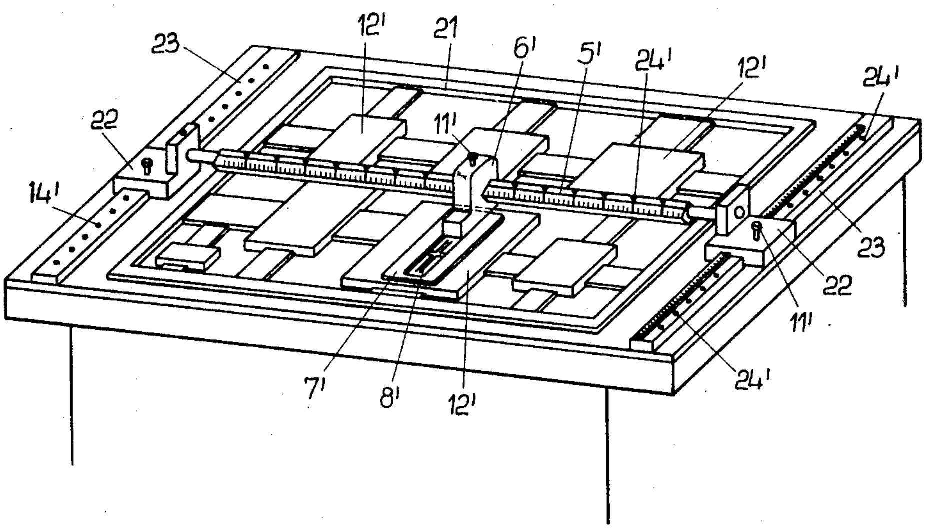
FIG. 2 is a prospective view of a printing form mounting device for flat printing forms.

FIG. 2 illustrates the same principle for use with flat printing forms. Instead of having a round printing form carrier 3 and a saddle piece 4 as shown in FIG. 1, a holding frame 21 is provided for holding flat printing forms 12′ in position. A transparent disc 7′ together with cross hairs 8′ are also mounted on a pivotable arm 6′ which is movable on guide rail 5′ in a step-by-step movement. A clamp bolt 11′ is provided through the top of arm 6′ in order to lock the resting position of arm 6′ to guide rail 5.

Figure 3:
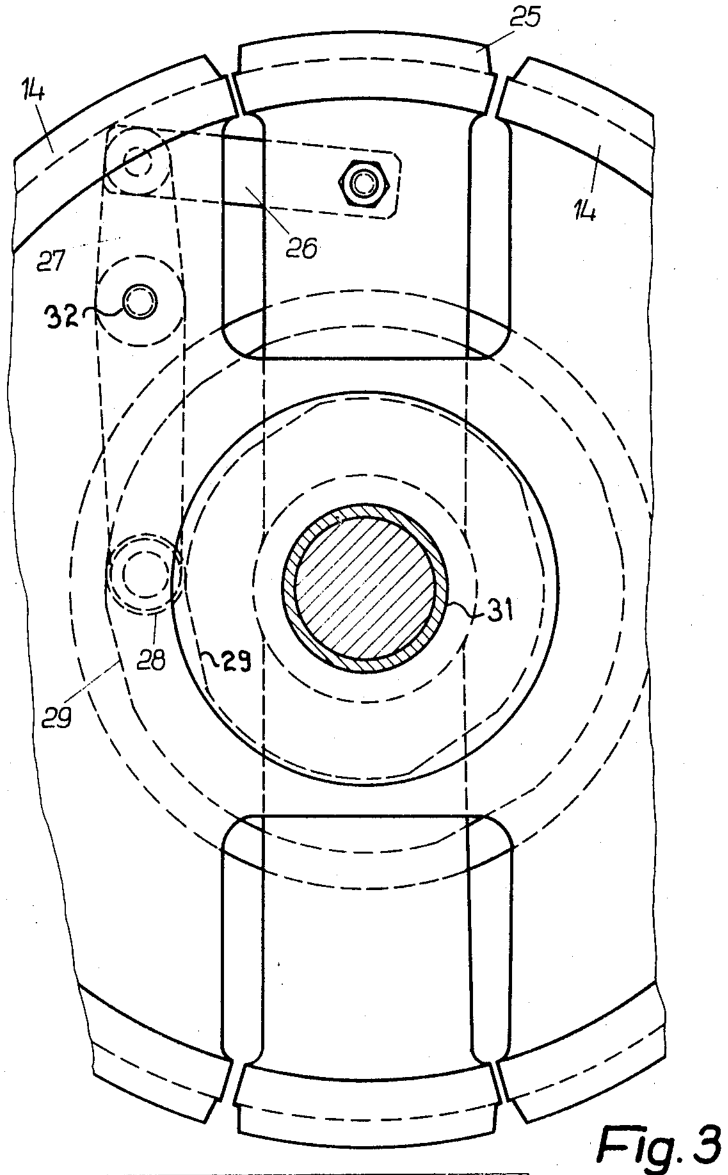
FIG. 3 show an enlarged side view of the worm drive wheel of FIG. 1.

In the same manner as the round printing forms are rotated by means of worm gear and worm wheel, guide rail 5′ can be moved through bearing mount 22 and on end guide rails 23 secured parallel on the ends of frame 21 in accordance with their spacing holes 14′. The spacings of resting position 24 and spacing holes 14, and the pitch of threads 24 and worm wheel 14 are identical and correspond to the linear graduation of the graduation device on the print form aligning table (not shown). When, for instance, 6 graduations are made from the right and 4 graduations are made from above on the aligning table by the cross hair, the operator may mount, on the form mounting device, either a round or flat printing form provided the same corresponding adjustments are required. In other words, the operator is not forced to align the printing form with the transparent print in the printing form mounting device, but has only to align the cross hair 8 or 8′ on the thin foil with the transparent disc 7 or 7′. Moreover, the spaced resting positions do not require an exact adjustment to a tenth of a millimeter to the right, such as for example, 567 mm. Because of the precisely spaced resting position, all misreadings and inaccuracies can be avoided. When round printing forms are used, it should be noted that the circumference of these forms very seldom corresponds to the chosen spacing of the resting positions, which in one example was given as 20 mm. When printing presses are used where the circumference of the cylinder requires more than one saddle type printing form and accurate resting positions are required in the range of the saddle type form, loosely turnably worm wheel segments 25 can be provided corresponding in number to the number of printing forms, as shown in FIG. 3 to compensate for displacement differences, which for a maximum graduation of 20 mm. result in a plus or minus difference of 10 mm. Therefore, worm wheel segments 25 can always be positioned opposite to the cutout of worm wheel 14 and pivotable on shaft 31 of carrier 3. Worm wheel 14 is fixedly connected with form printing carrier 3. The round form mounting device is always constructed for a defined circumference of carrier cylinder 3. The control of wheel segments is always accomplished in accordance with the circumference of the cylinder and is carried out by means of a joint 26 coupled at one end to segments 25, and coupled at its other end to a pivotable lever 27. Lever 27 pivots on axis 32 secured within the hub of wheel 14. A cam roller 28 which moves in a cam guide is pivoted in the other end of lever 27. When worm wheel 14 is rotated, and the worm gear moves in the range of the teeth of segments 25, roller 28 is in a lift position in guide 29, so that segments 25 are moved in the curcumferential direction of the worm gear during the engagement of its teeth corresponding with the teeth of worm wheel 14. It is obvious from the aforegoing that the worm gear may travel between the last tooth and the first tooth of the worm wheel 14, a longer or shorter path of travel with respect to the graduation, without creating an idleness or a pressure between the teeth. Therefore, the difference in the time of engagement of worm gear 13 with segment 25 of worm wheel 14 which is connected to the next form saddle 4, is compensated in that segments 25 run faster when the diameter of printing form 12 is larger, or lag when the diameter of the printing form is smaller.

Figure 4:
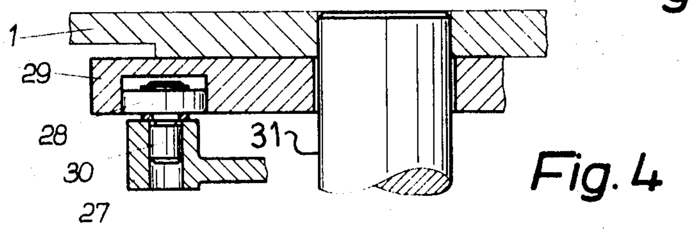
FIG. 4 is a partial cross-sectional view of the control cam for the tooth segment of FIG. 3.

FIG. 4 is a partial cross-sectional view through the curved cam guide member 29, wherein cam roller 28 may be clearly seen. Roller 28 is mounted on a pin 30 pivotably supported in lever 27. Cam guide 29 is secured to the opposite side of frame 1 and is adjusted only once during mounting.

While only a few embodiments of the invention have been shown and described, it will be understood that many changes and modifications may be made thereunto without departing from the spirit and scope of the invention.

What is claimed is:

1. A form mounting apparatus having a printing form carrier for mounting printing forms and the like from a separate form aligning table to the form saddle of the mounting apparatus comprising:

guide rails means mounted parallel with respect to the printing form carrier, frame means for supporting said guide rail means, a pivotable arm mounted for step-by-step movement on said guide rail means, a cross hair disposed on the free end of said pivotable arm so that linear graduation of the alignment table corresponds to the step-by-step movement of the guide rail means on the printing form carrier, clamping means disposed on said pivotable arm for arresting said arm to said guide rail means, a worm wheel secured on the axis at the end of the printing form carrier, worm gear means for selectively engaging said worm wheel, and means for locking said worm gear means to arrest displacement of the printing form carrier.

2. The apparatus as recited in claim 1 wherein said worm gear means comprises a worm gear and a bearing mount pivotably supporting said worm gear, said bearing mount being pivoted at one end to permit said worm gear to engage and disengage said worm wheel.

3. The apparatus as recited in claim 2 wherein said worm gear locking means comprises a crank coupled to said worm gear, and an arresting plate for arresting the motion of said crank.

4. The apparatus as recited in claim 3 wherein said guide rail means includes trapezoidal teeth along its length spaced apart to equal the displacement of said form carrier for one rotation of said crank.

5. The apparatus as recited in claim 1 wherein said worm wheel comprises a number of loosely mounted worm wheel segments corresponding to the number of printing forms, and means for controlling the placement of said segments within said worm wheel.

6. The apparatus as recited in claim 5 wherein said controlling means comprises a cam roller coupled through linkages to said wheel segment, and a cam guide engaged to said cam roller for controlling the placement of said wheel segments with respect to said worm wheel.

References Cited

UNITED STATES PATENTS

| | | | |
|---|---|---|---|
| 1,668,592 | 5/1928 | Huebner | 33—184.5 |
| 2,095,542 | 10/1937 | Claybourn | 33—184.5 |
| 2,100,114 | 11/1937 | Walsh | 33—184.5 |
| 2,104,553 | 1/1938 | Claybourn | 33—184.5 |
| 2,907,274 | 10/1959 | Taylor | 33—184.5 X |

WILLIAM D. MARTIN, Jr., Primary Examiner

U.S. Cl. X.R.

101—Dig. 12